United States Patent Office 3,460,936
Patented Aug. 12, 1969

3,460,936
LONG CHAIN AMINE SALTS AS PLANT
GROWTH REGULATORS
Walter W. Abramitis, Downers Grove, Ill., assignor, by mesne assignments, to Armour Industrial Chemical Company, a corporation of Delaware
No Drawing. Filed Oct. 22, 1965, Ser. No. 502,297
Int. Cl. A01n 5/00
U.S. Cl. 71—76   8 Claims

ABSTRACT OF THE DISCLOSURE

Long chain amine salts of organic acids, when applied as an organic solvent spray to various plants at certain times during their life or annual season cycle, effect dwarfage, improve frost resistance, control bloom and improve fruit size.

---

This invention relates to the treatment of plants to suppress growth, to impart frost resistance and to improve fruit yield. Surprisingly, the application of certain amine salts of organic acids to plants will accomplish all or some of these, dependent upon the time of treatment during plant life.

Plant growth suppressants, frost resistance imparting agents and the like have recently come into being. U.S. 2,923,095 typifies such recent activity. This patent describes and claims the use of organosilicic derivatives such as silanlos, siloxanols, alkoxysilanes, polysilanes, polysiloxanes and compounds having both polysilane and polysiloxane linkages. The organic groups attached to the silicon are lower alkyl and aryl groups. U.S. 3,129,529 is another typical example of such activity. The patent discloses and claims the use of a wax emulsion or an insulating material such as wood flour, asbestos fibers, carbon black, talc, chalk, lime and the like followed by a light reflective metal such as aluminum. The substance either melts off by itself or is washed off after all danger of frost has passed. An article in Science, volume 146, pp. 544–546, Oct. 23, 1964, is another example. Decenylsuccinic acid is disclosed as an agent which induces resistance to desiccation, cold and frost in young bean plants. And, when sprayed on flowering peach, apple and pear trees, most of the flowers are resistant to frost as low as −6° C.

Obviously, these advances in agriculture and arboriculture are highly desirable. The trade seeks still other agents which are more effective, are easier to apply or to remove, have less adverse effect on the plant being treated or on adjacent plants or stands of crop, are more economical and the like.

Accordingly, an object of this invention is to provide a novel class of compounds which, with proper application, suppress plant growth in a desirable manner.

Another object is to provide a class compounds which, with proper application, also impart frost resistance to the plant.

Still another object is to provide a class of compounds which, with proper application, also improve fruit size.

A further object is to provide a class of compounds which are easily applied to plants.

A still further object is to provide a class of compounds which, after application, have a prolonged effect, thus introducing economies into such type treatment.

Another object is to provide a class of compounds having the above attributes more pronounced than heretofore believed possible.

Other objects of the invention will in part be obvious and will in part appear hereinafter.

It has now been found that certain amine salts of organic acids, when properly applied during the life or annual season cycle of a plant, accomplish some and frequently all of the above listed objectives. More particularly, when the long chain $C_{8\ to\ 22}$ amine salts of organic acids, such as levulinic

phthalic

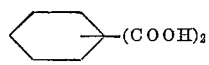

acetic $CH_3COOH$ and the like are applied as an organic solvent spray to various plants, at certain times during their life or annual season cycle, certain desirable attributes, such as dwarfage, frost resistance, bloom control, improved fruit size and the like, are imparted to the plant. The particular attribute imparted will be more evident from the examples which follow.

The invention accordingly comprises the several steps and the relation of one or more of such steps with respect to each of the others thereof and a composition of matter possessing the characteristics, properties, and the relation of components which will be exemplified in the process and composition hereinafter disclosed, and the scope of the invention will be indicated in the claims.

The following examples illustrate plant growth regulation by the amine salts of this invention.

EXAMPLE I

Grass control

Potted sod grass (Kentucky blue) is sprayed to wetting with a solution containing 1 ml. of stock solution containing dimethyldodecylamine acetate, 4 lbs./gal. in 74 ml. of water at the equivalent rate of 100 gals./acre. The treatment is replicated twice and compared to untreated grass. Table I summarizes the results.

TABLE I

|  | Grass clippings (gms.) | | | | | Total harvested (grams) | Average grass height (inches) | | | | |
|---|---|---|---|---|---|---|---|---|---|---|---|
|  | 1st 11 days | 2nd 18 days | 3rd 24 days | 4th 39 days | 5th 66 days | | | | | | |
| Untreated | 26.1 | 18.5 | 11.3 | 13.5 | 21.5 | 90.9 | 4.25 | 3.25 | 2.5 | 2.75 | 4.5 |
| Treated | 25.6 | 20.5 | 10.8 | 12.6 | 13.9 | 83.4 | 4.0 | 3.5 | 2.25 | 2.75 | 2.85 |

EXAMPLE II

Grass control

Potted grass of the type indicated is sprayed with growth suppressing chemicals on a date noted. Then grass height measurements are taken on five successive dates following the noted date (approximately one week apart). The grass is then clipped to an approximate height of 3–3½ inches, fertilized twice several days apart and readings again taken on three successive dates following (approximately 10 days apart). The summary of the results is indicated in Table II below.

TABLE II.—GRASS GROWTH INHIBITION

| Treatments (50 gal./acre) | | | Pre-fertilization | | Post-fertilization | |
| --- | --- | --- | --- | --- | --- | --- |
| | | | Average of 4 readings times 5 dates | | Average of 4 readings times 3 dates | |
| Compound | Activity | Concentration (based on active chemical) | Inches | Difference from control | Inches | Difference from control |
| Kentucky Bluegrass: | | | | | | |
| Dimethylcocoamine acetate | 100% active | 0.1% solution | 4.3 | −2.6 | 4.7 | −0.2 |
| Do | do | 1.0% solution | 4.5 | −2.4 | 4.9 | 0 |
| Bis-(dimethylcocoamine) maleate | do | 0.1% solution | 4.8 | −2.3 | 4.8 | −0.1 |
| Do | do | 1.0% solution | 4.9 | −2.0 | 5.2 | 0.3 |
| Methyldodecylamine acetate | 50% active | 0.1% solution | 5.0 | −1.9 | 5.1 | 0.2 |
| Do | do | 1.0% solution | 5.2 | −1.7 | 5.1 | 0.2 |
| Control | | | 6.9 | | 4.9 | |
| Kentucky 31 Fescue: | | | | | | |
| Dimethylcocoamine acetate | 100% active | 0.1% solution | 4.6 | −2.3 | 6.0 | 0.4 |
| Do | do | 1.0% solution | 5.3 | −1.6 | 6.5 | 0.9 |
| Bis-(dimethylcocoamine) maleate | do | 0.1% solution | 5.9 | −1.0 | 6.4 | 0.8 |
| Do | do | 1.0% solution | 5.9 | −1.0 | 6.2 | 0.6 |
| Methyldodecylamine acetate | 50% active | 0.1% solution | 5.3 | −1.6 | 6.5 | 0.9 |
| Do | do | 1.0% solution | 5.5 | −1.4 | 6.4 | 0.8 |
| Control | | | 6.9 | | 5.6 | |

EXAMPLE III

Peach tree control

The indicated compounds are applied to peach trees (one per treatment) in full bloom. The plant growth regulating properties of each are noted. The observations are tabulated in Table III.

TABLE III.—GROWTH REGULATION

| Treatment.—Application at full bloom (March 19-23) | | | Terminal measurement (inches) Nov. 14 [1] | No. buds/ft., December 9 |
| --- | --- | --- | --- | --- |
| | Concentration | | | |
| Compound | p.p.m. | Percent | | |
| Methyldodecylamine acetate | 1,000 | 0.1 | 29 | 18 |
| Dimethyldodecylamine acetate | 1,000 | 0.1 | [2] 24 | 18 |
| Dimethylcocoamine dimethyldithiocarbamate | 1,000 | 0.1 | 30 | 20 |
| Dimethylcocoamine acetate | 1,000 | 0.1 | 37 | 17 |
| Dimethylcocoamine propionate | 1,000 | 0.1 | 29 | 17 |
| Dimethylcocoamine lactate | 1,000 | 0.1 | 34 | 17 |
| Dimethylcocoamine levalinate | 1,000 | 0.1 | 40 | 16 |
| Dimethylcocoamine maleate mono-salt | 1,000 | 0.1 | 31 | 17 |
| Dimethylcocoamine maleate, di-salt | 1,000 | 0.1 | 32 | 18 |
| Dimethylcocoamine malonate, mono-salt | 1,000 | 0.1 | 37 | 17 |
| Dimethylcocoamine succinate, mono-salt | 1,000 | 0.1 | 14 | 20 |
| Control 1 | | | 35 | 15 |
| Control 2 | | | 34 | 15 |

[1] Average of 5 random measurements.
[2] Spur growth.

EXAMPLE IV

Bean plant control

When young bean plants in a greenhouse are sprayed with the indicated compounds to wetting, and thereafter observed for growth response, the following results will be found.

TABLE IV

| Compound | Rate, p.p.m. | Growth in cm. |
| --- | --- | --- |
| Dimethyldodecylamine succinate | 250 | 5.0 |
| Do | 500 | 1.5 |
| Do | 5,000 | Injury |
| Dimethylsuccinamic acid | 500 | 2.5 |
| Control | | 30.0 |

The values in Table IV indicate that the amine salts of this invention are effective growth retardants showing a growth reduction of 95.0% of the control when sprayed with a solution of 500 p.p.m. of the salt.

EXAMPLE V

Bean plant control

Methyldodecylamine acetate and dimethyldodecylamine acetate when applied to tender green bean plants in a greenhouse using 10 ml. of 0.1 and 0.01% sprays suppress elongation of the plant. Table V tabulates the results:

TABLE V

| | Conc., percent | Height, inches |
| --- | --- | --- |
| Control | | 33 |
| Dimethyldodecylamine acetate | 0.1 | 14 |
| Do | 0.01 | 19 |
| Methyldodecylamine acetate | 0.1 | 10 |
| Do | 0.01 | 18 |

EXAMPLE VI

Bean plants sprayed with dimethyldodecylamine acetate in the concentrations indicated give the following results:

TABLE VI

| | Average height increase, inches | Average intermode growth, inches |
| --- | --- | --- |
| Conc., percent: | | |
| .01 | 1.06 | 0.31 |
| .001 | 3.05 | 2.05 |
| Control | 4.35 | 3.60 |
| .01 | 0.58 | 0.25 |
| .005 | 2.37 | 2.12 |
| .0025 | 3.19 | 3.73 |
| .01 | 3.86 | 4.20 |
| .005 | 3.75 | 3.75 |
| Control | 6.93 | 7.31 |

EXAMPLE VII

General crop control

Young plants (soybean, tomato, cotton) in a greenhouse are sprayed until wet with the chemicals listed, and observed for growth in height and measurements taken. Table VII which follows tabulates such data.

TABLE VII

| Chemical | Soybean | | | | Tomato | | | | Cotton | | |
|---|---|---|---|---|---|---|---|---|---|---|---|
| | Conc. (p.p.m.) | Start (in.) | 15 Days (in.) | 15-day Diff. (in.) | Conc. (p.p.m.) | 4 days (in.) | 16 days (in.) | 12-day Diff. (in.) | Conc. (p.p.m.) | Observation | Dwarfed |
| Mono-dimethyl cocoamine succinate | 1,000 | 5.25 | 5.5 | 0.25 | 500 | 3.5 | 7.0 | 3.5 | | | |
| Di-dimethyl cocoamine succinate | 1,000 | 6.00 | 6.5 | 0.5 | 500 | 2.5 | 3.0 | 0.5 | 500 | Visual | D |
| Mono-ethomeen T/15 succinate | 1,000 | 5.5 | 5.5 | 0.0 | | | | | | | |
| Di-ethomeen T/15 succinate | 1,000 | 6.5 | 7.0 | 0.5 | | | | | | | |
| Mono-ethomeen C/15 succinate | 1,000 | 6.0 | 7.25 | 1.25 | 1,000 | 4.0 | 6.5 | 2.5 | | | |
| Di-ethomeen C/15 succinate | 1,000 | 7.5 | 7.5 | 0.0 | 1,000 | 4.0 | 7.0 | 3.0 | | | |
| Mono dimethyldodecylamine succinate | 1,000 | 6.0 | 6.0 | 0.0 | 1,000 | 3.0 | 5.0 | 2.0 | 1,000 | Visual | D |
| Di-dimethyldodecylamine succinate | 1,000 | 5.5 | 6.0 | 0.5 | 1,000 | | Killed | | | | |
| Mono-dimethyl oleylamine succinate | 1,000 | 6.0 | 6.75 | 0.75 | | | | | | | |
| Di-dimethyl oleylamine succinate | 1,000 | 5.5 | 6.25 | 0.75 | | | | | | | |
| Di-dimethyl cocoamine phthalate | | | | | | | | | 1,000 | Visual | D |
| Dimethyl cocoamine naphthenate | | | | | | | | | 1,000 | do | D |
| Mono-dimethyl hexadecylamine succinate | 1,000 | 6.5 | 7.0 | 0.5 | | | | | | | |
| Di-dimethyl hexadecylamine succinate | 1,000 | 5.25 | 6.0 | 0.75 | | | | | | | |
| Mono-dimethyl cocoamine fumarate | 1,000 | 4.75 | 5.5 | 0.75 | 1,000 | 3.5 | 5.0 | 1.5 | 1,000 | Visual | D |
| Di-dimethyl cocoamine fumarate | 1,000 | 4.75 | 5.5 | 0.75 | 1,000 | | Killed | | | do | D |
| Mono-dimethylcocoamine citrate | 1,000 | 5.5 | 6.5 | 1.0 | 1,000 | 4.0 | 6.0 | 2.0 | 1,000 | do | |
| Di-dimethylcocoamine citrate | 1,000 | 6.5 | 7.0 | 0.5 | 1,000 | | Killed | | 1,000 | do | D |
| Mono-dimethyl cocoamine tartarate | 1,000 | 6.5 | 7.0 | 0.5 | | | | | | | |
| Di-dimethyl cocoamine tartarate | 1,000 | 5.5 | 5.75 | 0.25 | 1,000 | | Killed | | | | |
| Mono-octylamine succinate | 1,000 | 6.0 | 6.0 | 0.0 | | | | | | | |
| Di-octylamine succinate | 1,000 | 7.0 | 7.0 | 0.0 | | | | | | | |
| Mono cocoamine succinate | 1,000 | 6.5 | 7.25 | 0.75 | | | | | | | |
| Di-cocoamine succinate | 1,000 | 7.25 | 7.25 | 0.0 | | | | | | | |
| Mono-$\beta$-undecyl to pentadecylamine | 1,000 | 6.5 | 7.0 | 0.5 | 1,000 | 4.0 | 6.5 | 2.5 | 1,000 | Visual | D |
| Di-$\beta$-undecyl to pentadecylamine | 1,000 | 6.5 | 6.5 | 0.0 | 1,000 | 4.5 | 5.0 | 0.5 | | | |
| Mono-dodecylamine succinate | 1,000 | 5.5 | 5.5 | 0.0 | 1,000 | | Killed | | | | |
| Di-dodecylamine succinate | 1,000 | 5.75 | 5.75 | 0.0 | 1,000 | 3.0 | 4.5 | 1.5 | | | |
| Mono-olecylamine succinate | 1,000 | 5.75 | 5.75 | 0.0 | | | | | | | |
| Dimethyl cocoamine lactate | 1,000 | 8.0 | 8.0 | 0.0 | | | | | | | |
| Mono-dimethyl cocoamine maleate | 1,000 | 6.5 | 6.5 | 0.0 | | | | | | | |
| Check (no treatment) | | 7.25 | 7.75 | 0.5 | | 5.0 / 4.5 | 3.0 / 7.0 | 3.0 / 2.5 | | | |

From the above data supplied, it can readily be seen that such chemicals inhibit a variety of plant species.

EXAMPLE VIII

Bean plant control and frost resistance

Young bean plants in a greenhouse are sprayed to wetting and observed for growth as well as frost resistance. Table VIII tabulates the results:

TABLE VIII.—TREATMENT

| | | Observation | |
|---|---|---|---|
| Compound | Rate (p.p.m.) | Growth, cm. | Cold resistance *LD$_{50}$, °C. |
| Dimethylcocoamine phthalate | 50 | 8.3 | −6.5 |
| Dimethylcocoamine succinate (mono) | 200 | 8.3 | −6.5 |
| Dimethylcocoamine levulinate | 50 | 16.3 | −5.5 |
| Dimethylcocoamine citrate (mono) | 50 | 7.5 | −5.5 |
| Decenyl succinic acid | 100 | 11.5 | −7.5 |
| Control | | 12.5 | −5.5 |

*50% plant killed.

The following examples illustrate the frost control abilities of the amine salts of this invention.

EXAMPLE IX

Apple and cherry tree frost resistance

The named trees are sprayed in the field and branches removed and placed in water. They are then taken into the laboratory and lowered to a temperature of 33° for one-half hour; then placed in a freezer at −4.5° C. for one-half hour. The branches are held for several days and the percent damage noted. The following observations appear:

TABLE IX.—APPLE (PINK STAGE)

| TREATMENT—Compound | Rate (p.p.m.) | Percent kill | | | |
|---|---|---|---|---|---|
| | | Leaf | Stamen | Style | Carpel |
| Dimethylcocoamine phthalate | 50 | 1 | 0 | 25 | 0 |
| Dimethylcocoamine levulinate | 50 | 1 | 2 | 25 | 0 |
| Dimethylcocoamine citrate (mono) | 50 | 0 | 0 | 25 | 0 |
| Dimethylcocoamine succinate (mono) | 50 | 0 | 0 | 0 | 0 |
| Dimethylsuccinamic acid | 500 | 10 | 40 | 70 | 15 |
| Decenylsuccinic acid | 200 | 4 | 15 | 30 | 15 |
| Control (no treatment) | | 4 | 12 | 16 | 12 |

TABLE X.—CHERRY (PETAL FALL STAGE)

| TREATMENT—Compound | Rate (p.p.m.) | Percent kill | | | |
|---|---|---|---|---|---|
| | | Leaf | Stamen | Style | Ovary |
| Dimethylcocoamine phthalate | 50 | 1 | 85 | 90 | 10 |
| Dimethylcocoamine levulinate | 50 | 4 | 90 | 95 | 95 |
| Dimethylcocoamine citrate (mono) | 50 | 2 | 55 | 100 | 20 |
| Dimethylcocoamine succinate (mono) | 50 | 2 | 15 | 75 | 5 |
| Dimethylsuccinamic acid | 500 | 0 | 20 | 95 | 70 |
| Decenylsuccinic acid | 200 | 8 | 65 | 90 | 75 |
| Control (no treatment) | | 7 | 75 | 90 | 80 |

The compounds that are useful are the amine salts of organic acids. The acid moiety has from 2 to 22 carbon atoms, such as acetic, propionic, butyric, caproic, caprylic, capric, lauric, myristic, palmitic, stearic, arachidic, behenic, lignoceric, lauroleic, myristoleic, palmitoleic, oleic, gadoleic, erucic, ricinoleic, linoleic, linolenic, eleostearic, licanic, arachidonic, clupanodonic, fumaric, citric, succinic, malic, malonic, phthalic, levulinic, maleic or mixtures thereof such as commonly found in the vegetable oils, animal fats and oils and marine fats and oils. The amine moiety may comprise one or more straight or branched, unsubstituted or substituted aliphatic, unsubstituted or substituted aromatic, or combination of said aliphatic and aromatic radicals, and unsubstituted or substituted alicyclic radicals. The substituents that are substituted on the main radical may comprise chlorine, bromine, or iodine, nitrate, sulfate, nitrite and the like.

Usually a wetting agent is helpful, such as an anionic, cationic or nonionic surfactant. Typical examples are polyoxyethylene sorbitan monolaurate (Armotans by Armour and Company, Chicago, Ill., and Tween by Atlas Powder Co., Wilmington, Del.), sorbitan monolaurate (Spans by Atlas Powder Co., Wilmington, Del.), isooctyl phenyl polyethoxy ethanol (Triton X-100 by Rohm & Haas Co., Philadelphia, Pa.), polyoxyethyleneglycol esters of fatty acids (Ethofats by Armour and Company, Chicago, Ill.). The wetting agent may comprise .01 to 10% by weight of the amine salt used.

The amine salt may be applied as a solution, an emulsion or a wettable powder spray.

For solvation, the solvents that are useful are ethanol, isopropanol, acetone, xylene or even water with a solubilizer therein.

The concentration range that is useful is 10 to 10,000 p.p.m. (.001 to 1.0%), and the preferred concentration is usually 50 to 1000 p.p.m.

As to plants that may be treated, the following are typical examples: grass, beans, apples, peaches, cherries, pears, parsley, tomato, soybeans, cotton, and many others.

The timing of application is also important. If the compound is applied just before or just after closing of the bloom (calyx stage) dwarfage results. If applied after early fruit formation, fruit size is stimulated. As to frost control, usually early or late application is used.

Although the exact mechanism is not understood, it is believed that the amine salts, when absorbed by the plant, create a saline solution in the individual cells of the plant. This creates frost resistance and also alters the metabolism of the plant to either cause dwarfage or fruit size stimulation dependent upon the formation of such saline solution within the cells.

It will thus be seen that the objects set forth above, among those made apparent from the preceding description, are efficiently attained, and since certain changes may be made in carrying out the above method and in the above composition of matter without departing from the scope of the invention, it is intended that all matter contained in the above description shall be interpreted as illustrative and not in a limiting sense.

Now that the invention has been described, what is claimed is:

1. A method for the treatment of plants to induce dwarfage, to improve frost resistance and to improve fruit yield comprising applying to said plants a carrier having 10 to 10,000 p.p.m. of an amine salt of an organic acid during its growing cycle, said $C_8$ to $C_{22}$ amine being selected from the group consisting of secondary, tertiary and branched chain amines and said acid being selected from the group consisting of acetic, propionic, butyric, fumaric, citric, succinic, malic, phthalic, levulinic and maleic acids.

2. The method of claim 1 wherein said application to induce dwarfage of said plants is performed from bud to early fruit-forming stage.

3. The method of claim 1 wherein said application to improve frost resistance to said plants is performed during their early growth and during their late growth periods.

4. The method of claim 1 wherein said application to improve fruit yield of said plants is performed after early fruit formation.

5. The method of claim 1 for inducing dwarfage of grass comprising spraying said grass with a non-toxic solution of dimethylcocoamine acetate at the rate of 50 gal./acre.

6. The method of claim 1 for improving the fruit yield of peach trees comprising spraying said trees during their full bloom stage with a non-toxic solution of about 1000 p.p.m. of dimethylcocoamine acetate.

7. The method of claim 1 for inducing dwarfage and improving frost resistance of bean plants comprising spraying said bean plants with a non-toxic solution of about 50 to 500 p.p.m. of dimethylcocoamine phthalate.

8. The method of claim 1 for improving the frost resistance of fruit trees comprising spraying said trees with a non-toxic solution of about 50 to 500 p.p.m. of an amine salt of an organic acid, said amine being selected from the group consisting of secondary, tertiary and branched chain amines and said acid being selected from the group consisting of acetic, propionic, butyric, fumaric, citric, succinic, malic, phthalic, levulinic and maleic acids.

References Cited

UNITED STATES PATENTS

| | | | |
|---|---|---|---|
| 2,394,916 | 2/1946 | Jones | 71—111 |
| 2,556,665 | 6/1951 | Smith et al. | 71—111 |
| 2,781,399 | 2/1957 | Shapiro | 260—583 |
| 3,178,277 | 4/1965 | Reck et al. | 71—88 |
| 3,223,517 | 12/1965 | Abramitis et al. | 71—79 |

OTHER REFERENCES

Steward et al.: "Plant Growth Regulators" (1956) CA 51, pp. 1525–26 (1957).

Berenschot et al.: "Freeze Stabilization of Polymeric Latex Coating Compositions" (1959) CA 53, pp. 14540–41 (1959).

Marsh et al.: "Gasoline Anti-Icing Additives" (1963) CA 60, p. 15664 (1946).

ELBERT L. ROBERTS, Primary Examiner

G. HOLLRAH, Assistant Examiner

U.S. Cl. X.R.

71—113, 115